(12) United States Patent
Tung et al.

(10) Patent No.: US 10,102,738 B2
(45) Date of Patent: Oct. 16, 2018

(54) PORTABLE SECURITY DEVICE

(71) Applicant: Sentri Inc., Walnut, CA (US)

(72) Inventors: Yen-Liang Tung, Taipei (TW);
Wang-Jui Hsieh, New Taipei (TW);
Fu-Yia Hsieh, Yongjing (TW)

(73) Assignee: HENRY'S PRODUCTS LLC, Palo Alto, CA (US)

( * ) Notice: Subject to any disclaimer, the term of this patent is extended or adjusted under 35 U.S.C. 154(b) by 35 days.

(21) Appl. No.: 14/856,315

(22) Filed: Sep. 16, 2015

(65) Prior Publication Data
US 2016/0093198 A1    Mar. 31, 2016

Related U.S. Application Data

(60) Provisional application No. 62/057,864, filed on Sep. 30, 2014.

(51) Int. Cl.
| | | |
|---|---|---|
| *G08B 25/01* | (2006.01) | |
| *G08B 21/04* | (2006.01) | |
| *G08B 25/00* | (2006.01) | |
| *H04L 29/08* | (2006.01) | |
| *G06N 99/00* | (2010.01) | |

(52) U.S. Cl.
CPC ....... *G08B 25/016* (2013.01); *G08B 21/0423* (2013.01); *G08B 25/008* (2013.01); *G06N 99/005* (2013.01); *H04L 67/12* (2013.01)

(58) Field of Classification Search
CPC .............. G08B 21/0423; G08B 25/008; G08B 25/016; G06N 99/005; H04L 67/12
See application file for complete search history.

(56) References Cited

U.S. PATENT DOCUMENTS

| | | |
|---|---|---|
| D480,725 S | 10/2003 | Funato |
| D491,953 S | 6/2004 | Arakaki et al. |
| 6,796,799 B1 * | 9/2004 | Yoshiike ............. G06F 19/3418 434/236 |
| D508,245 S | 8/2005 | Ozolins et al. |
| 7,113,090 B1 | 9/2006 | Saylor et al. |

(Continued)

OTHER PUBLICATIONS

European Search Report EP Application No. 15186340 dated Jun. 27, 2016, 10 pages.

(Continued)

*Primary Examiner* — Mohamed Barakat
(74) *Attorney, Agent, or Firm* — Perkins Coie LLP

(57) ABSTRACT

Several embodiments include a portable security device. The portable security device can include one or more sensors. The portable security device can compute a home rhythm pattern utilizing a machine learning engine based on a historical record of real-time sensor feeds. The portable security device can camouflage itself as a digital clock, a digital calendar, or a home security dashboard. The portable security device can define an action trigger that binds a state of the environment around the portable security device to at least a device component action. The portable security device can identify a real-time state of the portable security device amongst a finite set of potential states based on features observed from the sensor feeds. The portable security device can execute the device component action at the portable security device in response to determining that the real-time state matches the action trigger.

27 Claims, 10 Drawing Sheets

(56) References Cited

U.S. PATENT DOCUMENTS

| | | |
|---|---|---|
| D535,992 S | 1/2007 | Ozolins et al. |
| D537,445 S | 2/2007 | Bousfield et al. |
| D648,722 S | 11/2011 | Meyerhoffer et al. |
| 8,151,608 B2 | 4/2012 | Fisher |
| 8,447,273 B1 * | 5/2013 | Friedlander ....... H04M 1/72577 382/115 |
| 8,620,841 B1 * | 12/2013 | Filson ................. H04L 12/1895 706/12 |
| D718,307 S | 11/2014 | Ozolins et al. |
| D727,901 S | 4/2015 | Nishimura et al. |
| D728,675 S | 5/2015 | Daniel et al. |
| D729,800 S | 5/2015 | Kitano et al. |
| D736,207 S | 8/2015 | Bousfield et al. |
| D737,786 S | 9/2015 | Loretan |
| D742,877 S | 11/2015 | Tsuchida et al. |
| 2003/0117279 A1 | 6/2003 | Ueno et al. |
| 2012/0163670 A1 | 6/2012 | Eaton et al. |
| 2013/0031037 A1 * | 1/2013 | Brandt ................ H04L 63/1408 706/12 |
| 2014/0052681 A1 * | 2/2014 | Nitz ........................ H04L 51/02 706/46 |
| 2015/0020191 A1 * | 1/2015 | Vida ....................... G06F 21/32 726/17 |
| 2015/0365217 A1 | 12/2015 | Scholten et al. |
| 2017/0301218 A1 | 10/2017 | Tung |

OTHER PUBLICATIONS

Final Office Action dated Jun. 5, 2018 in U.S. Appl. No. 15/632,998 for Tung, Y.L., filed Jun. 26, 2017, 16 pages.

Non-Final Office Action dated Oct. 5, 2017 in U.S. Appl. No. 15/632,998 for Tung, Y.L., filed Jun. 26, 2017, 16 pages.

Notice of Allowability dated Mar. 9, 2016 in U.S. Appl. No. 29/504,341 of Luo, W-W. et al., filed Oct. 3, 2014, 5 pages.

* cited by examiner

PORTABLE SECURITY DEVICE

CROSS-REFERENCE To RELATED APPLICATIONS

This application claims the benefit of U.S. Provisional Patent Application No. 62/057,864, entitled "PORTABLE SECURITY DEVICE," filed Sep. 30, 2014, which is incorporated by reference herein in its entirety.

RELATED FIELD

At least one embodiment of this disclosure relates generally to a home security system, and in particular to a wireless home security system.

BACKGROUND

A traditional home security system comprises a number of cameras and/or motion sensors wired to a command center that records the camera feeds and activates an alarm whenever motion is detected. The traditional home security system oftentimes require complicated installations and may require semi-permanent modifications to a home. Stand-alone wireless cameras are sometimes used as alternatives to the traditional home security system. However, such stand-alone wireless cameras lack the intelligence of a home security system that is capable of responding to events in real-time. The standalone wireless cameras also appear obtrusive in a home environment putting people on their edges.

A conventional alert system associated with the traditional home security system functions in a very static way. Because of this, certain scenarios may consistently generate false alarms or overreactions. For example, an open window blowing on a curtain may always accidentally trigger a motion sensor.

DISCLOSURE OVERVIEW

Disclosed is a portable security device comprising at least one or more sensors, a display surface, a network interface, a processor, a memory, one or more cameras, or any combination thereof. In various embodiments, the portable security device is configured to monitor continuously real-time feeds from the one or more sensors and the one or more cameras to determine one or more home rhythms with or without user input. A home rhythm is a pattern observed by the portable security device that the portable security device has determined to be consistently and predictably occurring in its environment. An observed pattern may be deemed a home rhythm when it satisfies a statistical threshold of occurring consistently and/or predictably. In some embodiments, existing home rhythms can be periodically cross-validated based on real-time sensor data.

For example, the home rhythms can be determined based on one or more machine learning algorithms (e.g., Hidden Markov Model, Support Vector Machine, Gaussian Mixture Model) or statistical analysis (e.g., principal component analysis or other dimension reduction analysis). The processor can compute feature vectors based on these real-time feeds and generate or adjust machine learning models based on the real-time feature vectors. In some embodiments, the portable security device can provide (e.g., upload) the real-time feeds and/or the feature vectors or a least a portion thereof to a computer server (e.g., a cloud server or a computer in the local network), where the computer server can generate or adjust the machine learning models.

These home rhythms can be used to generate message trigger rules (e.g., when a deviation from the home rhythms is detected), operational state change rules, user behavior prediction, device control trigger rules, or any combination thereof. The message trigger rules indicate stimulus patterns as observed from the real-time feeds that can trigger an alert message send or push to a user device (e.g., via a local WiFi network, Bluetooth peer to peer connection, an Internet service provider (ISP) coupled to the local WiFi network via a router, or any combination thereof).

Upon generating these home rhythms, the portable security device can verify the home rhythms with a user account associated therewith. For example, the portable security device can present a control interface on a display (e.g., of the portable security device or a user device coupled to the portable security device) to present one or more home rhythms for the user to verify (e.g., via a touch screen integrated with the display). In some embodiments, the portable security device can authenticate the user's identity prior to presenting the control interface, such as through knowledge-based verification (e.g., typed password, gesture pattern, audio password, or any combination thereof), biometric (e.g., fingerprint recognition, silhouette recognition, speaker recognition, facial recognition, or any combination thereof), or possession-based verification (e.g., by presenting a device known to be possessed by the user), or any combination thereof.

In response to verifying the home rhythm, the portable security device can implement one or more rules associated with the home rhythm or generate additional rules to associate with the home rhythms. The rules, for example, can be to notify a user device whenever there is motion detected during 8 AM-6 PM in an assumed-to-be-empty house. The rules, for example, can be to notify a user device whenever there is a lack of motion detected for a duration of 45 minutes in a house where an elderly person is living. The rules, for example, can be to initiate an alert whenever temperature is above 40 degrees, humidity is above a certain threshold, or if carbon monoxide is detected. The rules associated with the home rhythm can essentially add environmental context conditions into inputs and outputs of the portable security device. This enables the portable security device to serve as an alert system or a home environment control system. In some embodiments, the portable security device can set up a geo-fence to facilitate the alert system (e.g., areas to monitor) or the home environment control system (e.g., areas to control).

In some embodiments, the portable security device includes a display (e.g., a touch screen). The display can be used to present an utility screen (e.g., a calendar, a dashboard, a clock, a photo frame, or any combination thereof). The utility screen can be displayed while monitoring the sensor feeds. The utility screen helps to camouflage the portable security device, making people within the monitored environment feel less at edge. In some embodiments, the portable security device includes a hole, hook, ring, or other structure to facilitate the portable security device to be hung on a wall. For example, the portable security device can display a clock and be hung on a wall as if it is a digital clock.

Some embodiments of this disclosure have other aspects, elements, features, and steps in addition to or in place of what is described above. These potential additions and replacements are described throughout the rest of the specification.

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
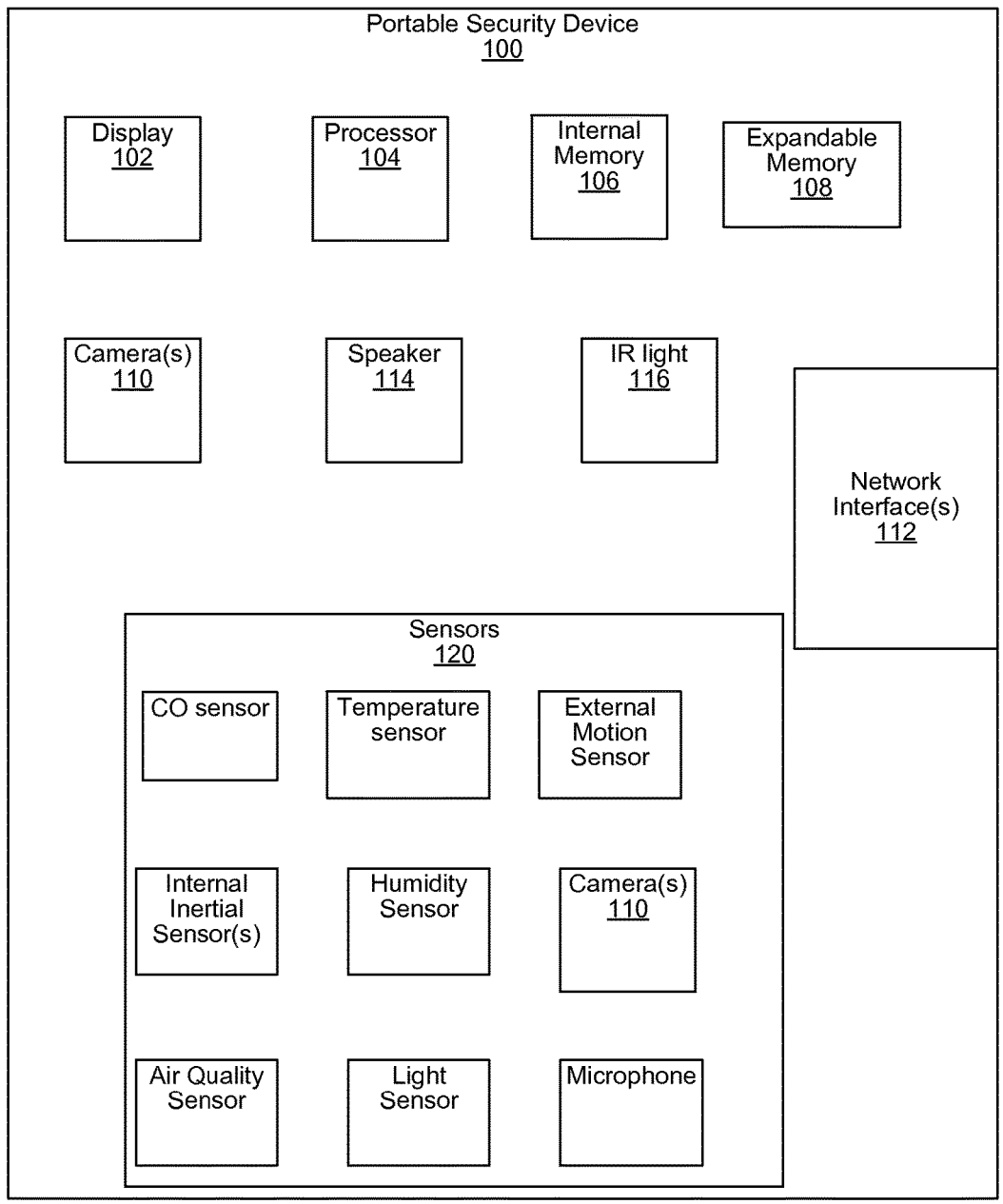
FIG. 1 is a block diagram of hardware components of a portable security device, in accordance with various embodiments.

FIG. 1 is a block diagram of hardware components of a portable security device 100, in accordance with various embodiments. The portable security system 100 comprises a display 102, a processor 104, an internal memory 106, an expandable memory 108, one or more cameras 110, one or more network interfaces 112, a speaker 114, an infrared (IR) light 116, and one or more sensors 120, or any combination thereof. In various embodiments, the display 102 is configured to present an utility screen, present one or more home rhythms or determined contextual events, enable a user to interact with the portable security device, or display data acquired by the one or more sensors 120. The display may be, for example, a liquid crystal display (LCD), a light-emitting diode (LED) display, a plasma display, or an organic LED display. In some embodiments, the display may be touchscreen (e.g., resistive touchscreen LCD, capacitive touchscreen LCD). The processor 104 can utilize data gathered by the one or more sensors 120 to generate and implement rules associated with a home rhythm. Moreover, the processor 104 may compare data gathered by the one or more sensors 120 to the rules associated with the home rhythm to determine whether to send a notification (e.g., push notification to a mobile device), whether the portable security device 100 to command a device action (e.g., turn off the lights), or what information, if any, gathered by the sensors 120 is to be displayed to the user via the display 102.

The internal memory 106 of the portable security device 100 can store information related to data gathered by the one or more sensors 120. The internal memory 106 may be, for example, read only memory (ROM), random access memory (RAM), flash memory, hard disk drive, or another suitable type of storage device. In various embodiments, the internal memory 106 may also store information received through the one or more network interfaces 112, data gathered by the one or more cameras 110, or additional data and/or information (e.g., picture or audio files). The portable security device 100 can optionally support an expandable memory 108. The expandable memory 108 can be configured to store additional data and/or information (e.g., picture or audio files) as desired by the user. The expandable memory 108 may be, for example, a Secure Digital (SD) card.

The one or more cameras 110 are configured to gather data to determine one or more home rhythms. The one or more cameras 110 may be configured to capture data in various light settings, including daytime and nighttime. In various embodiments, the portable security device 100 may comprise an infrared (IR) light 116, which can allow the user to utilize night vision and/or thermal imaging. In some embodiments, having multiple cameras 110 enables a three dimensional depth perception when the processor 104 is profiling the local environment or people (e.g., one or more users) in the local environment.

In some embodiments, the one or more cameras 110 are configured to turn on when the user is not home or when none of the residents is home. The portable security device 100 can detect whether the user is home by: (a) checking the GPS location of a mobile device associated with the user; (b) detecting if the user's mobile device is connected to the local area network (LAN) that the portable security device is connected to; or (c) checking whether a Bluetooth or other limited range wireless connection to the mobile device is established with the portable security device 100. In some embodiments, the one or more cameras 110 are configured to monitor and update the user with an alert in real-time whenever an irregular pattern is detected.

The one or more cameras 110 may be configured to store any gathered data on the internal memory 106, expandable memory 108, a cloud server, or any combination thereof, such that the user can access the data at a later point in time. The one or more cameras 110 can be configured to gather data and determine one or more home rhythms with or without user input.

For example, the portable security device 100 may be associated with a user device (e.g., desktop computer, laptop, tablet, smartphone, wearable devices, smart home appliances) using the one or more network interfaces 112. A video feed and/or an audio feed from the one or more cameras 110 and/or microphone(s) may be remotely presented on an external device. A video feed and/or an audio feed from the external device may also be presented on the portable security device 100, and thus enabling a 2-way audio or video communication. The network interfaces 112 (e.g., WiFi network, Bluetooth, Ethernet adapter, cellular transceiver, or any combination thereof) associated with the portable security device 100 enable the one or more sensors 120 to send and/or receive information for the processor 104.

In various embodiments, one or more sensors 120 associated with the portable security device 100 are configured to monitor a local environment and feed any data gathered in real-time to the processor 104. The processor 104 can continuously determine one or more home rhythms, or compliance with an established home rhythm, with or without user input. The one or more sensors 120 may be, for example, the one or more cameras 110, a carbon monoxide (CO) sensor, an air quality sensor, a temperature sensor, an audio sensor (e.g., one or more microphones), a motion sensor (e.g., to detect externally moving objects), a light sensor, a humidity sensor, an internal inertial sensor (e.g., accelerometer or a gyroscope), or any combination thereof. The sensor data can be stored in the internal memory 106, the expandable memory 108, a cloud server via the network interfaces 112, or any combination thereof.

The motion sensor, for example, can be a passive infrared (PIR) motion sensor embedded in the portable security device 100. The motion sensor can also include a Fresnel lens such that the motion sensor looks flat from the outside.

Moreover, the one or more sensors 120 may be configured to react to information from the processor 104 or an input from the user. In various embodiments, the portable security device 100 and the sensors 120 may be configured to allow the user to interact with the local environment. For example, the user may be able to use a user device (e.g., desktop computer, laptop, tablet, smartphone, wearable devices, smart home appliances) to communicate with the local environment through a speaker 114. The portable security device 100 can be powered through the use of a power connector (i.e., plug) and socket. However, some embodiments may contain a battery, either for long-term usage or short-term (i.e., backup) usage.

Figure 2:
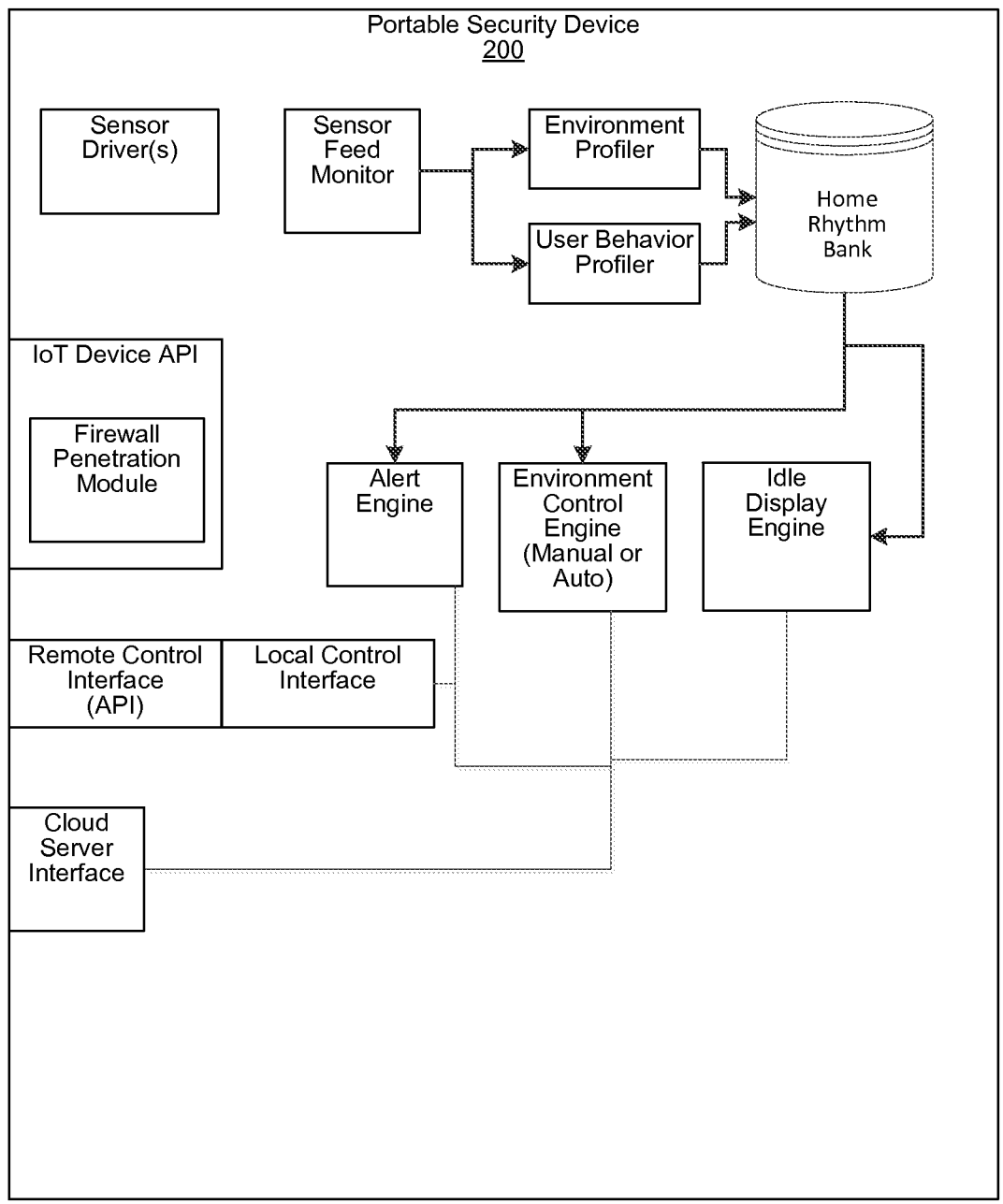
FIG. 2 is a functional block diagram of executable modules of a portable security device, in accordance with various embodiments.

FIG. 2 is a functional block diagram of executable modules of a portable security device 200, in accordance with various embodiments. The portable security device 200 can be the portable security device 100 of FIG. 1.

The sensor driver(s) allow the one or more sensors of portable security device 200, such as the one or more sensors 120 of FIG. 1, to gather information from the local environment and transmit the data to a processor of the portable security device 200, such as processor 104 of FIG. 1. In various embodiments, the processor may contain a sensor feed monitor. The sensor feed monitor can receive sensor feeds from one or more sensors of the portable security device 200, such as the one or more sensors 120 of FIG. 1. Any data received by the sensor feed monitor can then be delivered to the environment profiler and/or the user behavior profiler. The environment profiler and user behavior profiler are able to use one or more machine learning algorithms (e.g., Hidden Markov Model, Support Vector Machine, Gaussian Mixture Model) or statistical analysis (e.g., principal component analysis or other dimension reduction analysis) in order to determine a home rhythm for the user. Each of the profilers may be implemented within the portable security device 200 or within a separate (i.e., distinct) device (e.g., a cloud server). The profilers can be located within a separate memory (e.g., cloud storage). The portable security device 200 can upload information received from the sensors or derived therefrom through the use of one or more network interfaces, such as network interfaces 112 of FIG. 1. All or a portion of the home rhythms are then stored in the home rhythm bank. The home rhythm bank may store multiple rhythms for a single user or multiple rhythms for multiple users.

Once a home rhythm has been established and stored in the home rhythm bank, the home rhythm can then be compared to any data received by the sensor feed monitor. In various embodiments, the home rhythm bank may indicate that the portable security device 200 should alert the user, modify the local environment, or refrain from taking any further actions. For example, the alert engine may instruct a processor, such as processor 104 of FIG. 1, to send an alert message when an irregular pattern is detected in the sensor feeds. The user may be notified in a number of ways, including but not limited to, using push notifications to a smartphone or other mobile device, an email alert delivered to the user's email account, etc. Similarly, the environment control engine may generate instructions to modify the local environment based on the sensor data. The instructions may be executed by components of the portable security device 200 or other devices controlled by the portable security device 200. In various embodiments, the processor may execute a command to activate a controllable component (e.g., close the blinds, turn on the air conditioning) in order to modify the local environment of the portable security device 200 such that the conditions more favorably compare (i.e., are more similar to) to those stored in the home rhythm bank.

The idle display engine determines what to display on the portable security device 200 depending on the home rhythm. The idle display engine can determine whether to display an utility screen, such as a video conferencing interface, a sensor information dashboard, a context event timeline, a calendar, a screensaver, a clock, a digital photo frame interface, or any combination thereof. In some cases, the idle display engine can instruct the display to refrain from changing and/or instruct other controllable components to refrain from taking any further actions to modify the local environment. Such a condition may occur when the local characteristics as monitored by the one or more sensors are within a predetermined tolerance margin of those stored in the home rhythm bank.

The engines may be used to display information, modify the local environment, and/or alert the user in a number of scenarios, including, but not limited to, fire and/or fire alarm, flood and/or water leak, window(s) left open, infant and/or elderly person monitoring, home usage monitoring (e.g., Airbnb), utility usage monitoring, insurance applicant profiling, or any combination thereof.

In various embodiments, these engines (e.g., alert engine, environment control engine, idle display engine) may be able to display information and/or be controlled by a remote control interface or a local control interface of the portable security device 200. The local control interface may be controlled by the user of the portable security device 200 by interacting with the display, such as display 102 of FIG. 1. In some embodiments, the user may be able to display information and/or control the portable security device 200 through a remote control interface (e.g., smartphone, web page).

The portable security device 200 is able to interact with other smart devices by detecting their presence. One or more network interfaces, such as the network interfaces 112 of FIG. 1, enable the portable security device 200 to recognize other smart devices. The portable security device 200 can integrate with smart devices that have compatible application programming interfaces (APIs) or software development kits (SDKs). For example, the portable security device 200 may recognize a Nest Learning Thermostat, Wemo smart switches and power outlets, Philip Hue smart light bulbs, and Lockitron smart wireless locks, among other smart devices. An Internet of Things (IoT) device API and firewall penetration allow the smart devices to share data with the portable security device 200 with minimal interaction by the user. Moreover, the IoT device API and firewall penetration enable user interactions (e.g., sending user inputs and receiving data output to the user) with external smart devices through the use of the local control interface or the remote control interface.

In various embodiments, a cloud server can control the portable security device 200 through a cloud server interface. For example, the environment profiler, user behavior profiler, and home rhythm bank may be implemented or stored on the cloud server. In some embodiments, the cloud server can generate rules to implement on the portable security device 200.

Portions of components (e.g., including hardware components, executable modules, and databases) associated with the portable security device 100 and/or the portable security device 200 may be implemented in the form of special-purpose circuitry, in the form of one or more appropriately programmed programmable processors, a single board chip, a field programmable gate array, a network capable computing device, a virtual machine, a cloud-based terminal, or any combination thereof. The components may be hardware-based, firmware-based, software-based, or any combination thereof. For example, the components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not transitory signal. Memory space and storages described in the figures can be implemented with the tangible storage memory as well, including volatile or non-volatile memory.

Each of the components may operate individually and independently of other components. Some or all of the components may be executed on the same host device or on separate devices. The separate devices can be coupled through one or more communication channels (e.g., wireless or wired channel) to coordinate their operations. Some or all of the components may be combined as one component. A single component may be divided into sub-components, each sub-component performing separate method step or method steps of the single component.

In some embodiments, at least some of the components share access to a memory space. For example, one component may access data accessed by or transformed by another component. The components may be considered "coupled" to one another if they share a physical connection or a virtual connection, directly or indirectly, allowing data accessed or modified from one component to be accessed in another component. In some embodiments, at least some of the components can be upgraded or modified remotely (e.g., by reconfiguring executable instructions that implements a portion of the components). The portable security device 100 or the portable security device 200 may include additional, fewer, or different components for various applications.

Figure 3:
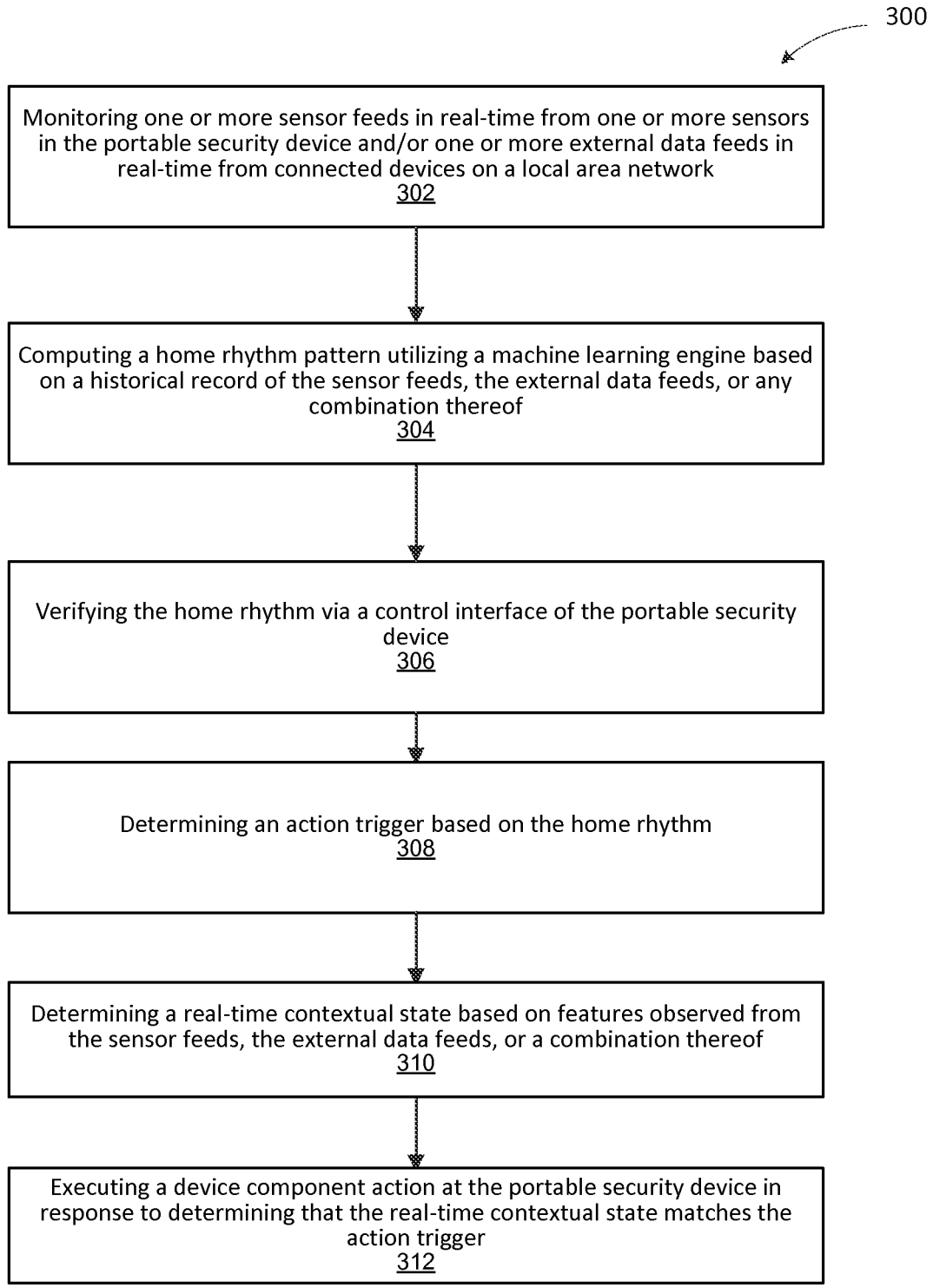
FIG. 3 is a flow chart of a method of operating a portable security device, in accordance with various embodiments.

FIG. 3 is a flow chart of a method 300 of operating a portable security device (e.g., the portable security device 100 of FIG. 1 or the portable security device 200 of FIG. 2), in accordance with various embodiments. At step 302, the portable security device can monitor one or more sensor feeds in real-time from one or more sensors (e.g., the one or more sensors 120 of FIG. 1) in the portable security device (e.g., the portable security device 100 of FIG. 1 or the portable security device 200 of FIG. 2) and/or one or more external data feeds in real-time from connected devices (e.g., Nest Learning Thermostat) in a local area network to which the portable security device is connected. The one or more sensors may be, for example, a CO sensor, one or more cameras, an air quality sensor, a temperature sensor, an audio sensor (e.g., microphone), a motion sensor/detector, a light sensor, a humidity sensor, an internal inertial sensor (e.g., accelerometer), or any combination thereof. The connected devices may be any smart device(s) that have compatible APIs or SDKs. For example, a connected device may be a Nest Learning Thermostat, Wemo smart switch or power outlet, Philip Hue smart light bulb, or Lockitron smart wireless lock.

At step 304, the portable security device can compute a home rhythm pattern utilizing a machine learning engine based on a historical record of the sensor feeds, the external data feeds, or any combination thereof. In some embodiments, the home rhythm is computed using one or more machine learning algorithms (e.g., Hidden Markov Model, Support Vector Machine, Gaussian Mixture Model) or statistical analysis (e.g., principal component analysis or other dimension reduction analysis). The home rhythm can include baseline values or ranges corresponding to each of the data feeds and/or sensor feeds. The home rhythm pattern can include an environmental state change pattern or a user behavior pattern.

At step 306, the portable security device can verify the home rhythm via a control interface (e.g., an interactive control interface) of the portable security device. In various embodiments, the control interface of the portable security device may be the display of the portable security device (e.g., display 102 of FIG. 1) or a remote control interface (e.g., smartphone, web page). The portable security device can provide access to the control interface to monitor or edit the action trigger or the home rhythm via an application programming interface (API) to a user device, an API to a third-party system, an API to a locally-implemented web server, an API to a cloud server, or any combination thereof.

The user interacts with the control interface of the portable security device by interacting with the display (e.g., touchscreen, controller). In some embodiments, the user may be able to display information and/or control the action(s) of the portable security device through the control interface. For example, when the portable security device detects a movement at home and send a user an alert at the user's mobile device. The user can use the mobile device to see the alert, and use a mobile application coupled to a wireless interface of the portable security device to real-time video check in what actually happened. The user can indicate whether it is a false alert via the control interface via the mobile application. For example, if it was a false alert, the user can tap the false alert button on the mobile application. A machine learning engine (e.g., an environment profiler or user behavior profiler) can learn this behavior to better predict the home rhythm.

At step 308, the portable security device determines an action trigger based on the home rhythm. In various embodiments, a comparison of the home rhythm with an established home rhythm pattern may indicate that the portable security device should alert the user, modify the local environment, or refrain from taking any further actions. For example, if the local environment of the portable security device becomes too warm, the action trigger may be to turn on the air conditioning and/or close the window shades to reduce the temperature of the local environment. In some embodiments, the action trigger specifies a state of an environment of the portable security device. The state can be selected from a finite set of potential states. The finite set of potential states can be computed as part of the home rhythm pattern at step 304. The action trigger can bind at least a device component action to the specified state.

At step 310, the portable security device determines (e.g., identify) a real-time contextual state of an environment of the portable security device based on features (e.g., numeric features) observed from the sensor feeds, the external data feeds, or a combination thereof. In various embodiments, the portable security device analyzes data acquired by the one or more sensors of the portable security device or the external data feeds from another device (e.g., Nest Learning Thermostat). The processor of the portable security device (e.g., processor 104 of FIG. 1) is able to aggregate data from the one or more sources and determine a real-time contextual state for the portable security device.

In some embodiments, the portable security device identifies the real-time contextual state by determining that a measurement reading from the sensor feeds is within a preset range associated with the real-time state. That is, one or more of the potential states can have corresponding preset ranges. In some embodiments, the portable security device identifies the real-time contextual state based on one or more statistical characteristics of the sensor feeds. For example, the statistical characteristics can include a moving average, a moving variance, a moving standard deviation, a current deviation from the moving average, or any combination thereof. In some embodiments, the portable security device identifies the real-time contextual state based on machine recognition of a known pattern in the sensor feeds. In some embodiments, the portable security device identifies the real-time contextual state based on machine recognition of an unknown pattern in the sensor feeds utilizing an unsupervised machine learning algorithm. In some embodiments, the portable security device identifies the real-time contextual state based on determining whether one or more measurement values in the sensor feeds indicate a deviation of the measurement values (e.g., as a whole or individually) beyond a threshold amount or percentage from baseline values according to the home rhythm. In some embodiments, the portable security device identifies the real-time contextual state based on features (e.g., numeric features) observed from the sensor feeds, the external data feeds, or a combination thereof.

At step 312, the portable security device executes a device component action at the portable security device. Execution of the device component action can be in response to determining that the real-time contextual state matches the action trigger. For example, the alert engine may configure the processor to determine, based on data received from the one or more sensors that the user should be alerted. The user may be notified in a number of ways, including but not limited to, using push notifications to a smartphone or other mobile device, an email alert delivered to the user's email account, etc. Similarly, the environment control engine may require that the processor modify the local environment based on data received from the one or more sensors. In various embodiments, the processor of the portable security device may order that an action may be taken (e.g., close the blinds, turn on the air conditioning) in order to modify the local environment of the portable security device such that the conditions more favorably compare (i.e., are more similar to) to the home rhythm pattern stored in the home rhythm bank. Alternatively, the idle display engine may require that a processor refrain from taking any further actions to modify the local environment of portable security device. Such a condition may occur when the local characteristics as monitored by the one or more sensors of the portable security device are within a predetermined tolerance margin of those in the established home rhythm pattern.

In some embodiments, executing the device component action includes configuring an output component device of the portable security device. The output component device can be a display, a speaker, a light, or any combination thereof. In some embodiments, executing the device component action includes recording an event utilizing at least an input component device of the portable security device.

In some embodiments, executing the device component action includes configuring an external device utilizing a network interface of the portable security device. The external device can be an Internet of Things (IoT) device, a computing device, a cloud computing system, or any combination thereof. In some embodiments, executing the device component action includes sending a message via a network interface of the portable security device, wherein the message includes natural language audio or textual content.

While processes or methods are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Figure 4:
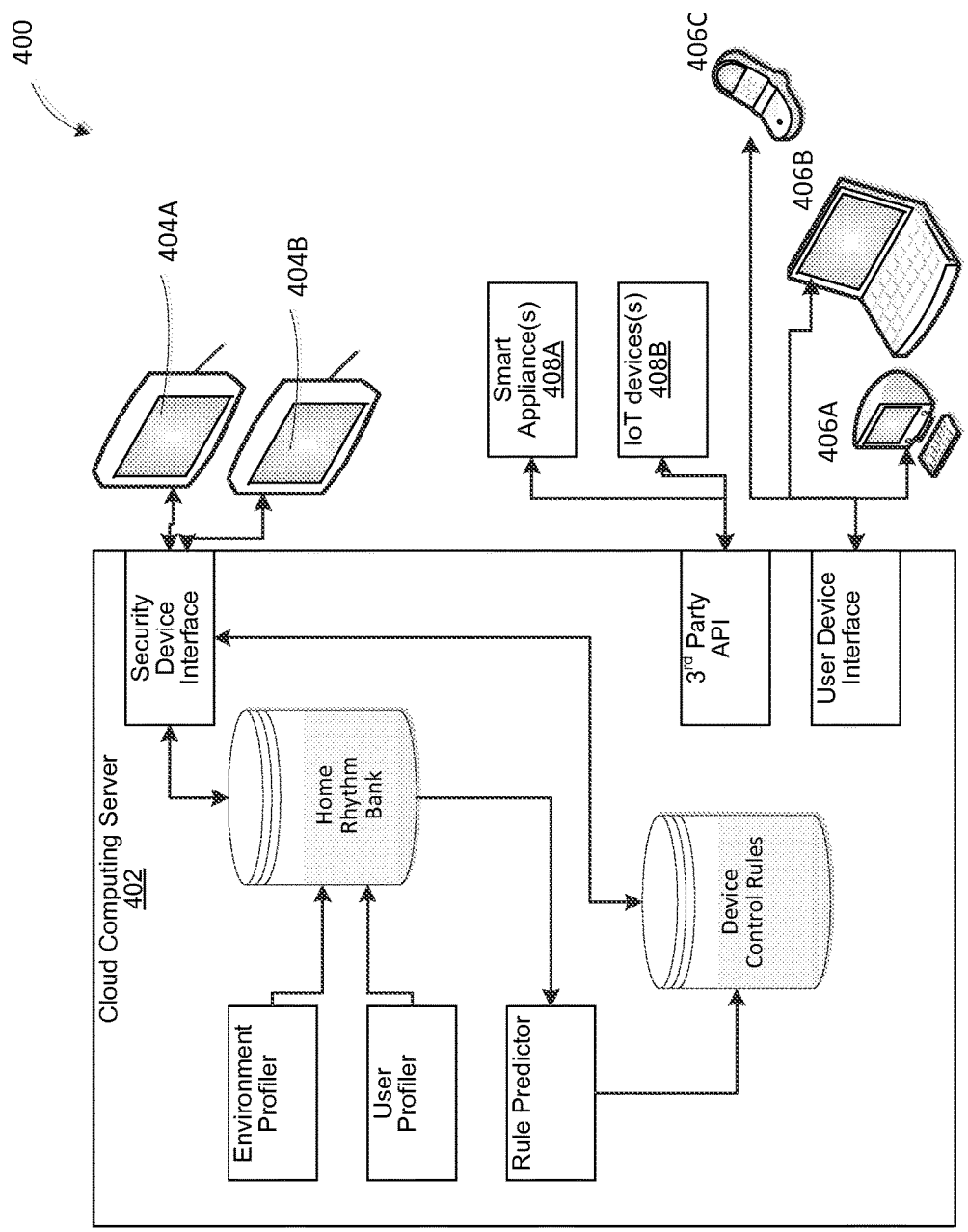
FIG. 4 is a block diagram of a cloud-based portable security system, in accordance with various embodiments.

FIG. 4 is a block diagram of a cloud-based portable security system 400, in accordance with various embodiments. The cloud-based portable security system 400 includes a cloud computing server 402 connected to at least one or more portable security devices 404 associated with a user account or a user group. The cloud computing server 402 can also be connected to one or more user devices 406, such as smart phones, tablets, laptops, desktop computers, wearable devices, smart home appliances, or any combination thereof. Each one or more user devices 406 interacts with the cloud computing server 402 through a user device interface. In various embodiments, the user device interface may be an application/program or a web page. The one or more user devices 406 may provide information to the cloud computing server through a local WiFi network, Bluetooth peer to peer connection, ISP coupled to the local WiFi network via a router, or any combination thereof.

In various embodiments, the cloud computing server 402 is able to gather information from one or more portable security devices 404 and/or one or more compatible smart appliances 408A or IoT devices 408B. The smart appliances 408A and/or IoT devices 408B are able to interact with the cloud computing server 402 so long as they use APIs or SDKs compatible with the cloud-based portable security system 400. Similarly, a security device interface is able to interact with and aggregate any data received from the one or more portable security devices 404.

Any data received by the cloud computing server 402 can then be delivered to the environment profiler and/or the user behavior profiler. The environment profiler and user behavior profiler are able to use one or more machine learning algorithms (e.g., Hidden Markov Model, Support Vector Machine, Gaussian Mixture Model) or statistical analysis (e.g., principal component analysis or other dimension reduction analysis) in order to determine a home rhythm for the user. In the presently described embodiment, the profilers are located within memory distinct from the one or more portable security devices 404. However, in various embodiments the profilers may be located on storage within the one or more portable security devices 404. All home rhythms are then stored in the home rhythm bank. The home rhythm bank may store multiple rhythms for a single user (e.g., before 6:00 PM, after 6:00 PM, weekday/weekend) or multiple rhythms for multiple users.

Once a home rhythm has been established and stored in the home rhythm bank, the rhythm can be used to create rules for the one or more portable security devices 404. The rule predictor can be used to create message trigger rules, operational state change rules, user behavior prediction rules, device control trigger rules, or any combination thereof. For example, a message trigger rule can indicate stimulus patterns as observed from the real-time feeds that can trigger an alert message to push to a user device (e.g., via an interrupt mechanism).

Once a home rhythm or set of home rhythms have been stored in the home rhythm bank, those rhythms can be used to create rules, which are then stored within the cloud computing server 402 as device control rules. These rules assist in determining what action to take, if any, when the cloud computing server 402 receives data from the one or more portable security devices 404, or compatible smart appliances 408A and/or IoT devices 408B. If the rule(s) determine that an action is necessary, that action is communicated to the one or more portable security devices 404 and/or compatible smart appliances 408A and IoT devices 408B through the security device interface.

Figure 5:
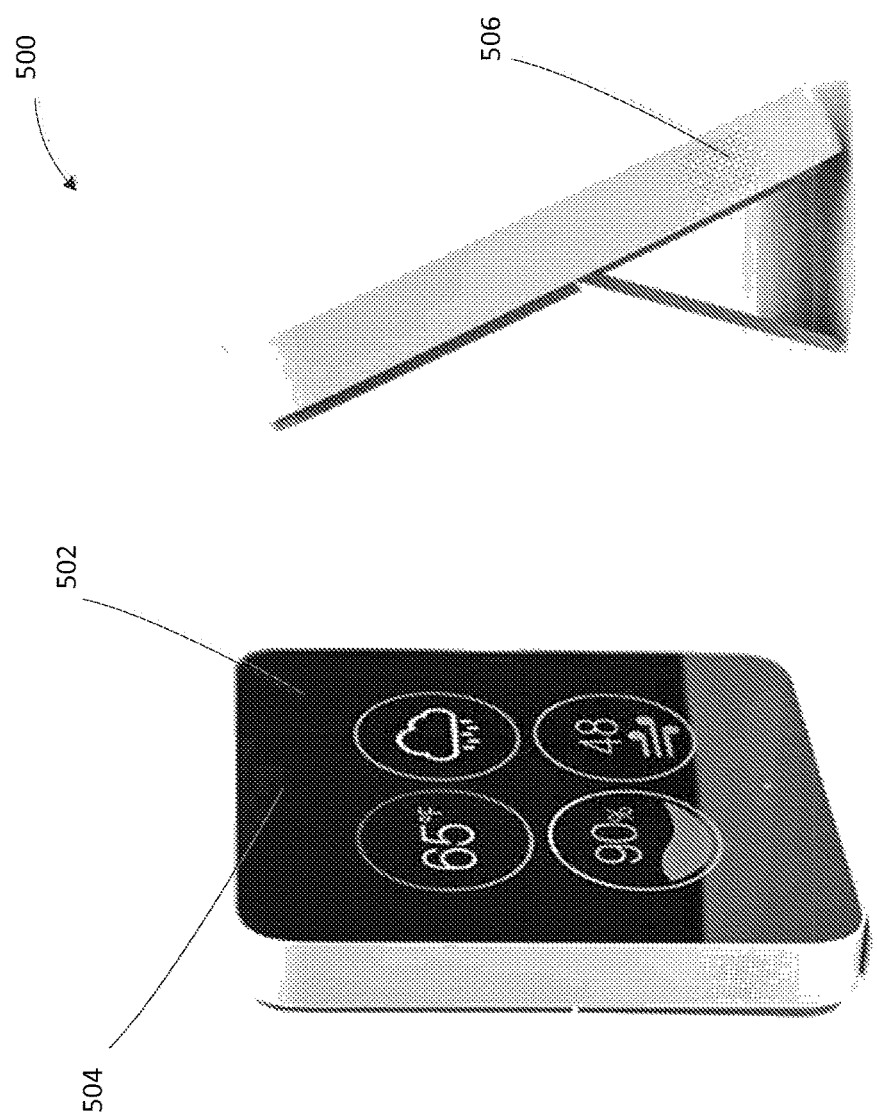
FIG. 5 is a perspective view of an illustration of a portable security device, in accordance with various embodiments.

FIG. 5 is a perspective view of an illustration of a portable security device 500, in accordance with various embodiments. The portable security device 500 can be the portable security device 100 of FIG. 1 or the portable security device 200 of FIG. 2. In various embodiments, a display 502 is configured to display a utility screen, present one or more home rhythms to the user, allow the user to interact with the portable security device 500, or display data acquired by the one or more sensors (e.g., sensors 120 of FIG. 1). For example, the portable security device 500 can display the current temperature, the current weather forecast, the current humidity, and various air quality indicators. In some embodiments, the display 502 may be touchscreen.

In various embodiments, the portable security device 500 and one or more sensors (e.g., a camera 504) may be configured to allow the user to interact with the local environment. For example, in the present embodiment the user may be able to use a user device (e.g., desktop computer, laptop, tablet, smartphone, wearable devices, smart home appliances) to communicate with the local environment through the speaker 506.

Figure 6:
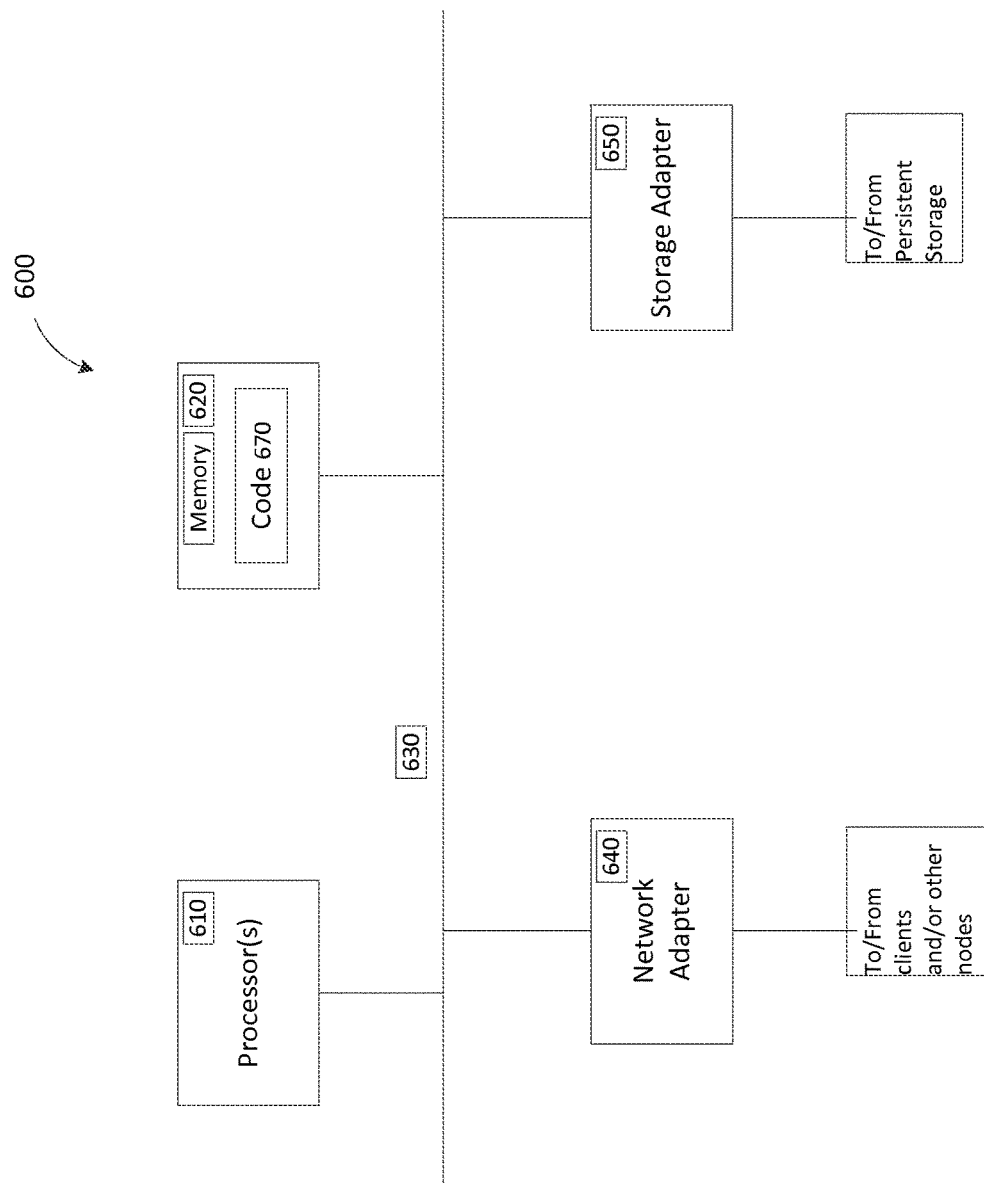
FIG. 6 is a block diagram of an example of a computing device, which may represent one or more computing device or server described herein, in accordance with various embodiments.

FIG. 6 is a block diagram of an example of a computing device 600, which may represent one or more computing device or server described herein, in accordance with various embodiments. The computing device 600 can be one or more computing devices that implement the cloud computing server 402 of FIG. 4 or methods and processes described in this disclosure (e.g., the method 300 of FIG. 3). The computing device 600 includes one or more processors 610 and memory 620 coupled to an interconnect 630. The interconnect 630 shown in FIG. 5 is an abstraction that represents any one or more separate physical buses, point-to-point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard bus, also called "Firewire".

The processor(s) 610 is/are the central processing unit (CPU) of the computing device 600 and thus controls the overall operation of the computing device 600. In certain embodiments, the processor(s) 610 accomplishes this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computing device 600. The memory 620 represents any form of random access memory (RAM), read-only memory (ROM), flash memory, or the like, or a combination of such devices. In use, the memory 620 may contain a code 670 containing instructions according to the mesh connection system disclosed herein.

Also connected to the processor(s) 610 through the interconnect 630 are a network adapter 640 and a storage adapter 650. The network adapter 640 provides the computing device 600 with the ability to communicate with remote devices, over a network and may be, for example, an Ethernet adapter or Fibre Channel adapter. The network adapter 640 may also provide the computing device 600 with the ability to communicate with other computers. The storage adapter 650 enables the computing device 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the computing device 600 by downloading it from a remote system through the computing device 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Figure 7A:
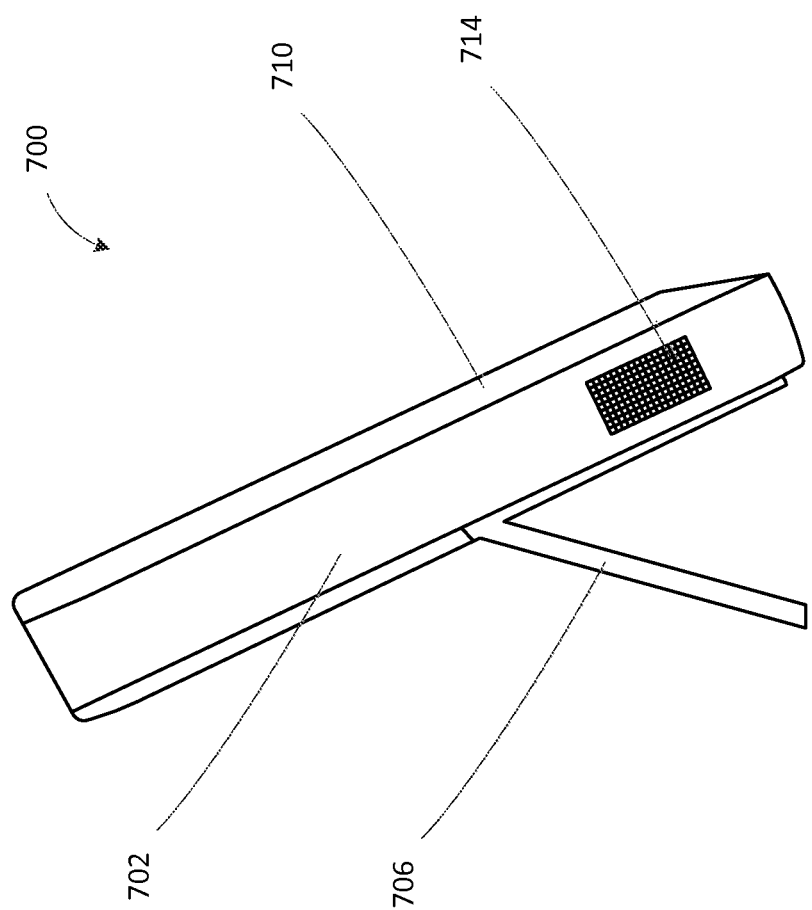
FIG. 7A is a side perspective view of a portable security device, in accordance with various embodiments.

FIG. 7A is a side perspective view of a portable security device 700, in accordance with various embodiments. The portable security device 700 can include a shell 702. For example, the shell 702 can enclose and protect the components described in the portable security device 200. In some embodiments, the shell 702 can include one or more holes that enable output components (e.g., a speaker) to interact with the environment. In some embodiments, the shell 702 can include one or more holes that enable input components/ sensors to observe the environment surrounding the portable security device 700.

The shell 702 can include an back panel 706. The back panel 706 may be part of the shell 702 on one side of the portable security device 700. The back panel 706 can open away (e.g., rotate from a hinge that is statically attached) from the portable security device 700 as illustrated. Once opened, the back panel 706 can act as a footing to keep the portable security device 700 at least partially upright pointing a display 710 (e.g., a touchscreen) at an angle upward from the horizon. The display 710 can be attached to one side of the shell 702. On one side of the shell 702 between the display 710 and the back panel 706, the portable security device can include a speaker 714.

Figure 7B:
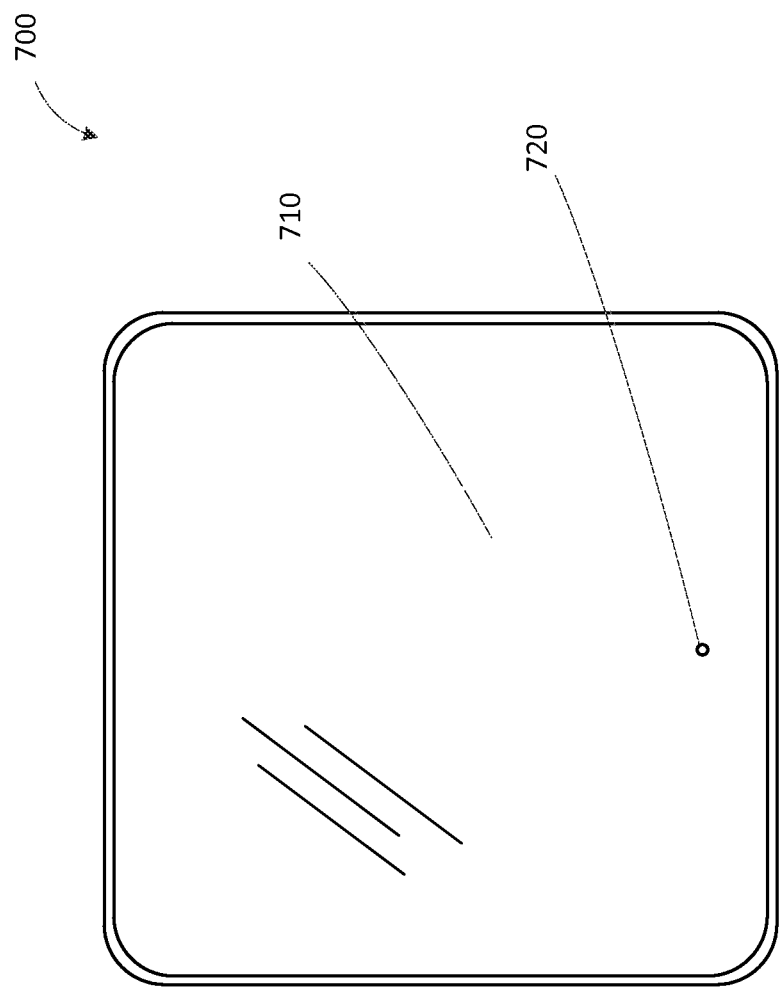
FIG. 7B is a front view of the portable security device of FIG. 7A, in accordance with various embodiments.

FIG. 7B is a front view of the portable security device 700 of FIG. 7A, in accordance with various embodiments. The front view of the portable security device 700 can be covered by the display 710. In some embodiments, a glass cover (not shown) of the display 710 can expose a camera 720.

Figure 7C:
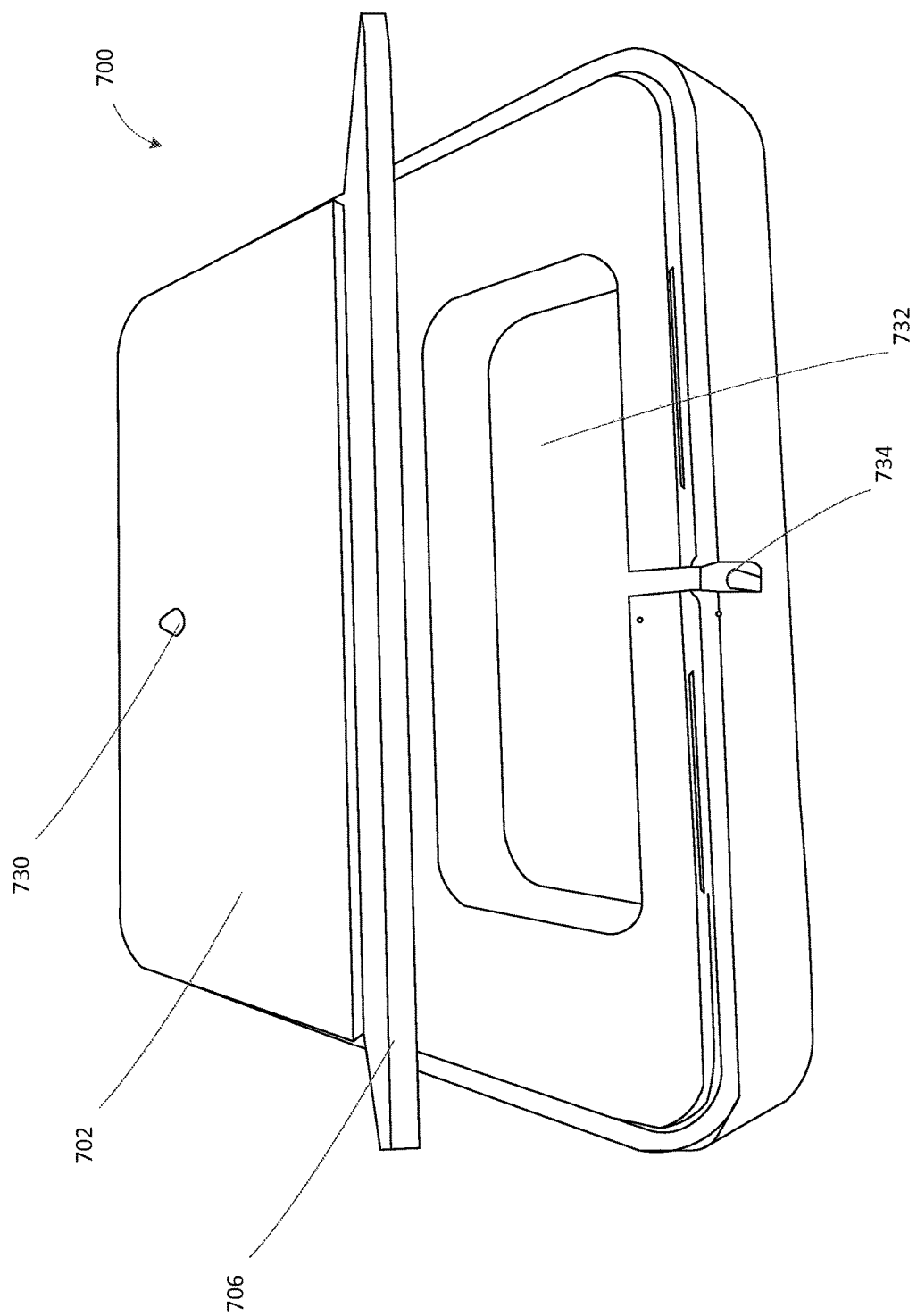
FIG. 7C is a back perspective view of the portable security device of FIG. 7A with a back panel opened, in accordance with various embodiments.
Figure 7D:
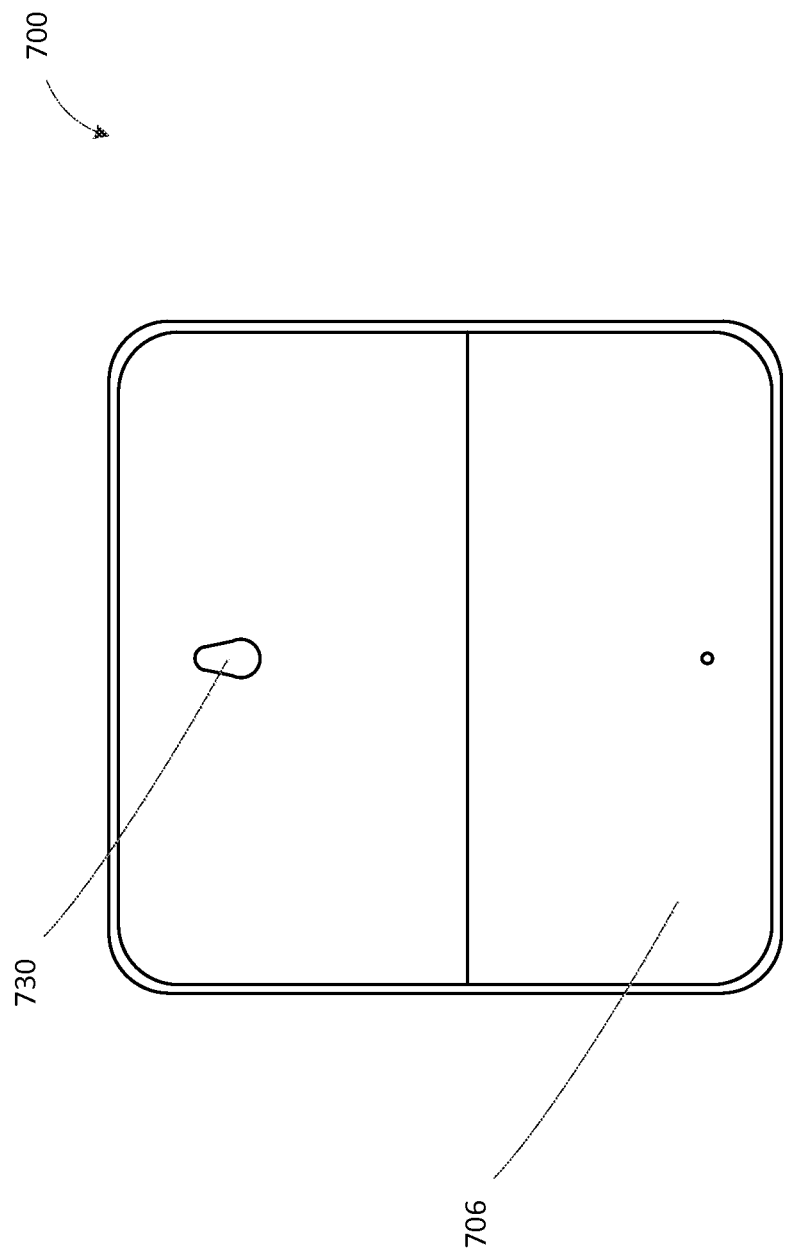
FIG. 7D is a back view of the portable security device of FIG. 7A with the back panel closed, in accordance with various embodiments.

FIG. 7C is a back perspective view of the portable security device 700 of FIG. 7A with the back panel 706 opened, in accordance with various embodiments. The shell 702 can include a statically attached portion and an openable portion (e.g., the back panel 706). The shell 702 can include a hole 730 to enable the portable security device 700 to be hung on the wall. The back panel 706, once opened, exposes a cavity 732. Various functional modules can be stored in the cavity 732. For example, a charger or a battery module can be stored in the cavity 732. The cavity 732 can be connected to a channel 734 that exposes the cavity 732 outside of the portable security device 700 even when the back panel 706 is closed. The channel 734, for example, can be used to run an interconnect (e.g., a power line and/or a communication line) between a port (not shown) inside the cavity 732 and an external source/target outside of the portable security device 700. FIG. 7D is a back view of the portable security device 700 of FIG. 7A with the back panel 706 closed, in accordance with various embodiments.

Some embodiments of the disclosure have other aspects, elements, features, and steps in addition to or in place of what is described above. These potential additions and replacements are described throughout the rest of the specification.

What is claimed is:

1. A method of operating a portable security device comprising:
   monitoring one or more sensor feeds in real-time from one or more sensors in the portable security device, the one or more sensor feeds providing information indicative of activity occurring within an environment of the portable security device;
   computing a home rhythm pattern utilizing a machine learning engine based on a historical record of the sensor feeds, the computing of the home rhythm pattern including determining that the historical record of the sensor feeds satisfies a statistical threshold related to activity occurring within the environment;
   defining an action trigger based on the home rhythm pattern, wherein the action trigger specifies a state of an environment of the portable security device amongst a finite set of potential states, wherein the action trigger binds at least a device component action to the specified state;
   identifying a real-time state of the environment of the portable security device based on features observed from the sensor feeds;
   executing the device component action at the portable security device in response to determining that the real-time state matches the action trigger;
   determining a response of a user within the environment of the portable security device to the execution of the device component action at the portable security device;
   adjusting the machine learning engine to provide an adjusted machine learning engine based on the response of the user within the environment of the portable security device to the execution of the device component action at the portable security device: and
   computing a second home rhythm pattern utilizing the adjusted machine learning engine and based on the historical record of the sensor feeds, the second home rhythm pattern being different than the home rhythm pattern.

2. The method of claim 1, further comprising verifying the home rhythm or the action trigger via a control interface displayed on a touch screen of the portable security device.

3. The method of claim 1, wherein the home rhythm pattern includes an environmental state change pattern or a user behavior pattern.

4. The method of claim 1, wherein executing the device component action includes configuring an output component device of the portable security device, the output component device being a display, a speaker, a light, or any combination thereof.

5. The method of claim 1, wherein executing the device component action includes recording an event utilizing at least an input component device of the portable security device.

6. The method of claim 1, wherein the sensors include a temperature sensor, an air quality sensor, a humidity sensor, a microphone, a motion detector, a camera, or any combination thereof.

7. The method of claim 1, wherein executing the device component action includes configuring an external device utilizing a network interface of the portable security device.

8. The method of claim 7, wherein the external device is an Internet of Things (loT) device, a computing device, a cloud computing system, or any combination thereof.

9. The method of claim 1, wherein executing the device component action includes sending a message via a network interface of the portable security device, wherein the message includes natural language audio or textual content.

10. The method of claim 1, further comprising providing access to a control interface to monitor or edit the action trigger or the home rhythm via an application programming interface (API) to a user device, an API to a third-party system, an API to a locally-implemented web server, an API to a cloud server, or any combination thereof.

11. The method of claim 1, wherein identifying the real-time state is by determining that a measurement reading from the sensor feeds is within a preset range associated with the real-time state, and wherein at least one of the potential states has a corresponding preset range.

12. The method of claim 1, wherein identifying the real-time state is based on one or more statistical characteristics of the sensor feeds.

13. The method of claim 12, wherein the statistical characteristics include a moving average, a moving variance, a moving standard deviation, a current deviation from the moving average, or any combination thereof.

14. The method of claim 1, wherein identifying the real-time state is based on machine recognition of a known pattern in the sensor feeds.

15. The method of claim 1, wherein identifying the real-time state is based on machine recognition of an unknown pattern in the sensor feeds utilizing an unsupervised machine learning algorithm.

16. The method of claim 1, wherein identifying the real-time state is based on determining whether the sensor feeds indicate a deviation beyond a threshold amount or percentage from baseline values according to the home rhythm.

17. The method of claim 1, further comprising:
monitoring one or more external data feeds in real-time from devices in a local area network to which the portable security device is connected; and
wherein computing the home rhythm pattern is based on a combination of the historical record of the sensor feeds and the external data feeds.

18. The method of claim 17, wherein identifying the real-time state is based on features observed from the sensor feeds, the external data feeds, or a combination thereof.

19. A portable security device comprising:
a touchscreen display covering or substantially covering at least one side of the portable security device, and wherein the touchscreen display is configured to present an interactive control interface;
one or more sensors configured to provide one or more sensor feeds of sensor readings, wherein the sensors include at least a temperature sensor, an air quality sensor, a motion detection sensor, or a humidity sensor;
a network connection interface configured to connect with a local area network (LAN), a peer-to-peer device, a wide area network (WAN), or any combination thereof;
a processor configured to:
compute a home rhythm pattern utilizing a machine learning engine based on a historical record of the sensor feeds, wherein the home rhythm pattern includes an environmental state change pattern or a user behavior pattern, the computing of the home rhythm pattern including determining that a historical record of the environmental state change pattern or the user behavior pattern satisfies a statistical threshold related to activity occurring within an environment of the portable security device;
define an action trigger that specifies a state of an environment of the portable security device, wherein the state is selected from amongst a finite set of potential states;
identify a real-time state of the environment of the portable security device based on numeric features observed in the sensor feeds;
execute a device component action at the portable security device in response to determining that the real-time state matches the action trigger;
determine a response of a user within the environment of the portable security device to the execution of the device component action at the portable security device;
adjusting the machine learning engine to provide an adjusted machine learning engine based on the response of the user within the environment of the portable security device to the execution of the device component action at the portable security device; and
computing a second home rhythm pattern utilizing the adjusted machine learning engine and based on the historical record of the sensor feeds, the second home rhythm pattern being different than the home rhythm pattern.

20. The portable security device of claim 19, further comprising a shell protecting the network connection interface, the processor, and the sensors.

21. The portable security device of claim 20, and wherein the shell exposes at least a hole over at least one of the sensor for the one sensor to observe the environment of the portable security device.

22. The portable security device of claim 20, and wherein the shell is attached to the touchscreen display and has a hole on the side across from the touchscreen display to enable the portable security device to be hung on a wall.

23. A non-transitory computer readable medium storing instructions there on which, when executed by a processor, cause the processor to:
monitor one or more sensor feeds in real-time from one or more sensors in a portable security device, the one or more sensor feeds providing information indicative of activity occurring within an environment of the portable security device;
compute a home rhythm pattern utilizing a machine learning engine based on a historical record of the sensor feeds, the computing of the home rhythm pattern including determining that the historical record of the sensor feeds satisfies a statistical threshold related to activity occurring within the environment;
define an action trigger based on the home rhythm pattern, wherein the action trigger specifies a state of an environment of the portable security device amongst a finite set of potential states, wherein the action trigger binds at least a device component action to the specified state;
identify a real-time state of the environment of the portable security device based on features observed from the sensor feeds;
execute the device component action at the portable security device in response to determining that the real-time state matches the action trigger
determine a response of a user within the environment of the portable security device to the execution of the device component action at the portable security device;
adjust the machine learning engine to provide an adjusted machine learning engine based on the response of the user within the environment of the portable security device to the execution of the device component action at the portable security device; and
compute a second home rhythm pattern utilizing the adjusted machine learning engine and based on the historical record of the sensor feeds, the second home rhythm pattern being different than the home rhythm pattern.

24. The method of claim 1, wherein executing the device component action at the portable security device in response to determining that the real-time state matches the action trigger includes adjusting functionality of a device within the environment of the portable security device, the functionality of the device adjusted to correspond to functionality of the device as indicated in the historical record of the sensor feeds.

25. The method of claim 1, further comprising:
defining the action trigger based on the second home rhythm pattern, wherein the action trigger based on the second home rhythm pattern specifies a second state of an environment of the portable security device that is different than the state of the environment of the portable security device specified by the home rhythm pattern.

26. The method of claim 1, further comprising:
 determining environmental context conditions of the environment of the portable security device, wherein the action trigger is also based on the environmental context conditions of the environment.

27. The method of claim 1, wherein the response of the user to the execution of the device component action includes the user providing an indication that the home rhythm pattern should be adjusted.

* * * * *